United States Patent
Butzmann

(10) Patent No.: US 9,143,004 B2
(45) Date of Patent: Sep. 22, 2015

(54) METHOD AND CIRCUIT ARRANGEMENT FOR CHARGING AN INTERMEDIATE CIRCUIT CAPACITOR

(75) Inventor: Stefan Butzmann, Beilstein (DE)

(73) Assignee: Rober Bosch GmbH, Stuttgart (DE)

( * ) Notice: Subject to any disclaimer, the term of this patent is extended or adjusted under 35 U.S.C. 154(b) by 257 days.

(21) Appl. No.: 13/823,068

(22) PCT Filed: Aug. 9, 2011

(86) PCT No.: PCT/EP2011/063668
§ 371 (c)(1),
(2), (4) Date: Jun. 10, 2013

(87) PCT Pub. No.: WO2012/034789
PCT Pub. Date: Mar. 22, 2012

(65) Prior Publication Data
US 2013/0300323 A1    Nov. 14, 2013

(30) Foreign Application Priority Data

Sep. 14, 2010    (DE) .......................... 10 2010 040 728

(51) Int. Cl.
*B60W 10/08*    (2006.01)
*H02J 7/34*    (2006.01)
*B60L 3/00*    (2006.01)

(52) U.S. Cl.
CPC . *H02J 7/34* (2013.01); *B60L 3/003* (2013.01); *H02J 7/345* (2013.01); *B60L 2270/20* (2013.01)

(58) Field of Classification Search
CPC ........................ Y02T 10/7005; B60W 10/08
USPC .............................. 318/139; 315/291; 363/47
See application file for complete search history.

(56) References Cited

U.S. PATENT DOCUMENTS

| | | | |
|---|---|---|---|
| 4,246,544 A * | 1/1981 | Itoh ............................... | 330/293 |
| 5,576,609 A | 11/1996 | Brown et al. | |
| 5,973,942 A | 10/1999 | Nelson et al. | |

FOREIGN PATENT DOCUMENTS

| | | |
|---|---|---|
| CN | 1482726 A | 3/2004 |
| DE | 199 03 427 A1 | 8/2000 |
| DE | 10 2004 018 261 A1 | 11/2005 |
| DE | 10 2006 050 529 A1 | 4/2008 |
| JP | 2003-180003 A | 6/2003 |

(Continued)

OTHER PUBLICATIONS

International Search Report corresponding to PCT Application No. PCT/EP2011/063668, mailed Mar. 19, 2012 (German and English language document) (8 pages).

*Primary Examiner* — Karen Masih
(74) *Attorney, Agent, or Firm* — Maginot, Moore & Beck LLP

(57) ABSTRACT

A method for charging an intermediate circuit capacitor in a precharging unit includes charging the intermediate circuit capacitor via a current source and adjusting the supplied current in such a manner that a constant power loss is produced in the current source during the entire charging operation. A circuit arrangement includes a battery which is connected to a current source which is connected to an intermediate circuit capacitor via a switch. An adjusting circuit is arranged in parallel with the current source and can be used to adjust the current for charging the intermediate circuit capacitor. The current is adjusted in such a manner that a constant power loss is produced in the current source during the entire charging operation.

9 Claims, 3 Drawing Sheets

(56) References Cited

FOREIGN PATENT DOCUMENTS

| JP | 2005-278302 A | 10/2005 |
| JP | 2010-110200 A | 5/2010 |
| WO | 2004/023637 A1 | 3/2004 |
| WO | 2005/006466 A2 | 1/2005 |

* cited by examiner

METHOD AND CIRCUIT ARRANGEMENT FOR CHARGING AN INTERMEDIATE CIRCUIT CAPACITOR

This application is a 35 U.S.C. §371 National Stage Application of PCT/EP2011/063668, filed on Aug. 9, 2011, which claims the benefit of priority to Serial No. DE 10 2010 040 728.3, filed on Sep. 14, 2010 in Germany, the disclosures of which are incorporated herein by reference in their entirety.

BACKGROUND

The present disclosure relates to a method for charging an intermediate-circuit capacitor and to a circuit arrangement for implementing the method.

The trend in the future development of battery systems, both for stationary applications such as wind power installations and for mobile applications such as in motor-vehicle technology, is toward new battery systems on which very high demands in terms of reliability are placed.

The background for said demands is that a failure of the battery can lead to a failure of the entire system. Thus, for example in the case of an electric vehicle, a failure of the traction battery can lead to a so-called "breakdown".

In the case of wind power installations, a failure of the battery can even lead to safety-related problems, since batteries are used here for example to protect the installation against impermissible operating states in the event of strong winds by adjusting the rotor blades.

In order to achieve the required power and energy data with the battery system, individual battery cells are connected in series and, in part, also in parallel.

In hybrid or electric vehicles, the battery is usually connected to the vehicle drive with two main contactors, when said vehicle is to be operated.

In the vehicle, there is also a so-called intermediate-circuit capacitor for cushioning voltage and current spikes.

However, said intermediate-circuit capacitor prohibits the two main contactors from being directly switched on, since in this case an extremely high current would flow through the contactors into the intermediate-circuit capacitor and could destroy the latter.

For this reason, according to the known prior art, a so-called precharging unit is used in the battery circuitry, which unit initially charges the intermediate-circuit capacitor with a limited current and the two main contactors are then only switched on once the intermediate-circuit capacitor has been charged.

The known prior art is illustrated in FIGS. 4 and 5.

FIG. 4 shows a typical circuit for charging the intermediate-circuit capacitor via a precharging resistor R. Here a so-called precharging relay is switched on and the intermediate-circuit capacitor is then charged via the precharging resistor R. After the desired intermediate-circuit voltage has been reached, the two main contactors are switched on.

A disadvantage of this solution is that a high current flows through the precharging unit at the start of the charging, said current decreasing exponentially over time and thus increasing the time until the main contactors are closed.

In order to reduce the switch-on time, the resistance value must be selected to be smaller, which directly results in higher power losses in the resistor and thus requires the use of a resistor which is larger in terms of volume, heavier and more expensive.

For this reason, a current source, as is shown in FIG. 5, is often used. A current source with a constant current leads to a constant gradient of the intermediate-circuit voltage during the charging operation.

However, in this connection it is disadvantageous that there is a high voltage across the current source at the start, that is to say when the intermediate-circuit capacitor is still discharged, which leads to a high power loss.

Since the charging operation usually takes a few 100 ms, the power components in the current source must be designed for said high power loss. However, use is not made of this dimensioning toward the end of the charging operation; a higher current could then flow here.

A circuit for charging batteries having a control system, through which the current is varied in order to ensure a constant power loss, is known from U.S. Pat. No. 5,576,609.

Essential elements of the control system of the charging device are current sensor, voltage sensor and an amplifier coupled to the sensors.

DE 102006050529 A1 describes a circuit arrangement for combined insulation and contactor monitoring of the current supply of an electric drive. Two voltage-measuring devices are provided to measure a voltage excursion. The power electronics system arranged there as well contains an intermediate-circuit capacitor, which is charged with limited current.

SUMMARY

According to the disclosure, a method is described, which provides a current source for charging an intermediate-circuit capacitor in a precharging unit, wherein the current source does not supply a constant current. The voltage across the current source is acquired and the current is adjusted in such a way that the current source works with a constant power loss during the entire charging operation.

The circuit arrangement of the disclosure has an adjusting circuit arranged in parallel with the current source, with which adjusting circuit the current can be adjusted in such a way that a constant power loss is produced in the current source during the entire charging operation.

The method of the disclosure affords the advantage that the duration of the precharging operation is reduced as, in order to charge an intermediate-circuit capacitor in a precharging unit, the intermediate-circuit capacitor is charged via a current source, the current of which is adjusted in a such a way that a constant power loss is produced in the current source during the entire charging operation.

Very advantageously, the method of the disclosure further allows the voltage across the current source during the charging operation to be acquired and the current supplied from the current source to be regulated.

A further advantage of the disclosure consists in the cost-effective and reliable construction of the circuit arrangement, as an adjusting circuit is arranged in parallel with the current source, with which adjusting circuit the current for charging the intermediate-circuit capacitor can be adjusted in such a way that a constant power loss is produced in the current source during the entire charging operation.

According to a preferred embodiment of the disclosure, it is provided that the constant power loss is adjusted by means of a Zener diode in combination with a resistor.

In one particular embodiment of the disclosure, it is provided that the adjusting circuit has transistors, which are connected to one another as a divider circuit.

Advantageous developments of the disclosure are specified in the dependent claims and described in the description.

BRIEF DESCRIPTION OF THE DRAWINGS

Exemplary embodiments of the disclosure will be explained in more detail on the basis of the following description and the drawings, in which.

DETAILED DESCRIPTION

Figure 1:
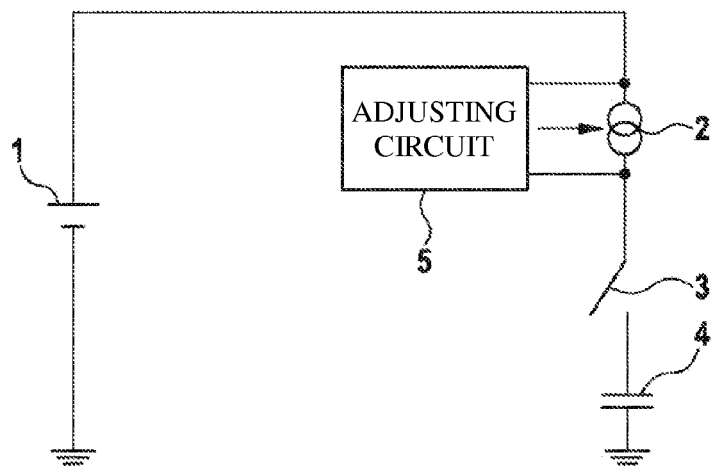
FIG. 1 shows a basic illustration of the current source of the disclosure with a constant power loss dependent on the intermediate-circuit voltage.

FIG. 1 shows the basic principle of the solution of the disclosure. A battery 1, in the present exemplary embodiment a lithium-ion battery, is connected to a current source 2. According to the disclosure, the voltage across the current source 2 is acquired and the current is adjusted in such a way that a constant power loss is produced in the current source 2 during the entire charging operation.

The current source 2 is connected to the intermediate-circuit capacitor 4 via a switch 3. An adjusting circuit 5 is arranged in parallel with the current source 2, with which adjusting circuit the current for charging the intermediate-circuit capacitor 4 can be adjusted in such a way that the constant power loss is produced in the current source 2 during the entire charging operation.

Figure 2:
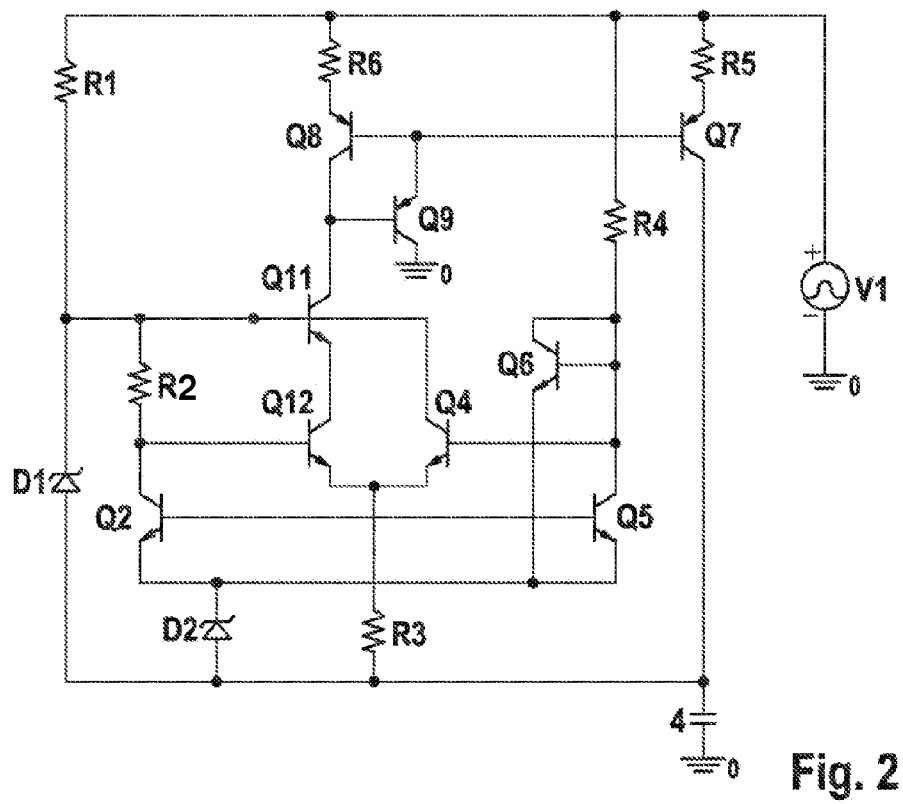
FIG. 2 shows a detailed circuit arrangement for implementing the basic illustration shown in FIG. 1.

FIG. 2 shows a possible embodiment of the disclosure. Here, the transistors Q2, Q12, Q4, Q5 and Q6 work as a divider circuit. The constant power loss is adjusted as desired power loss by means of the Zener diode 4 and the resistor R2. The voltage difference between the battery voltage and the intermediate-circuit capacitor voltage is acquired via the resistor R4. A current then flows at the collector of the transistor Q11, said current being proportional to the desired current of the current source 2. The actual current source 2 must then only be realized by means of a current mirror with an appropriate current ratio.

Figure 3:
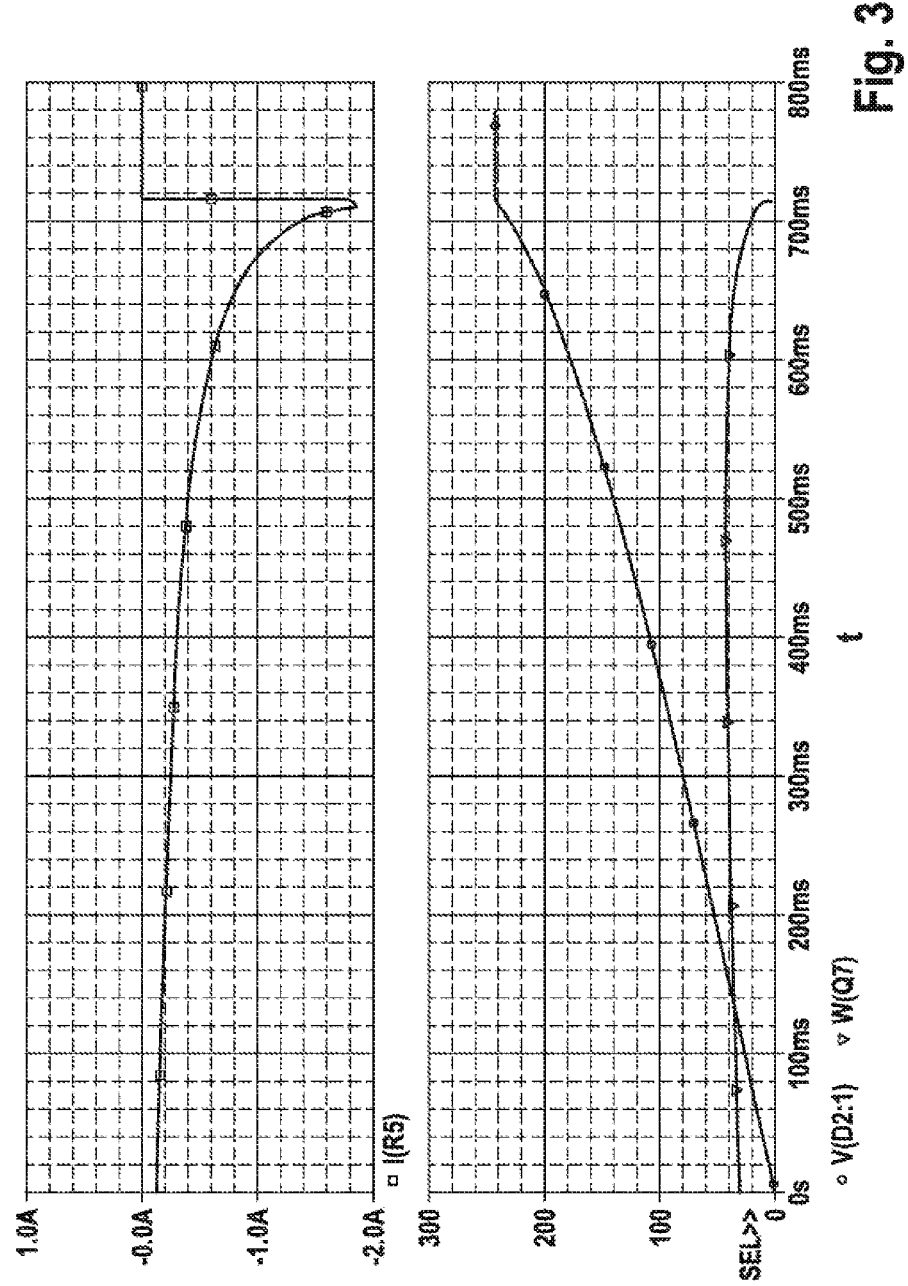
FIG. 3 shows simulation results for charging an intermediate-circuit capacitor.
Figure 4:
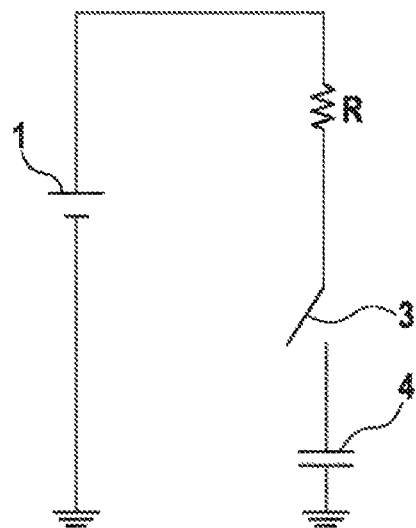
FIG. 4 shows a basic circuit diagram for a precharging unit for charging an intermediate-circuit capacitor from a battery system according to the prior art.
Figure 5:
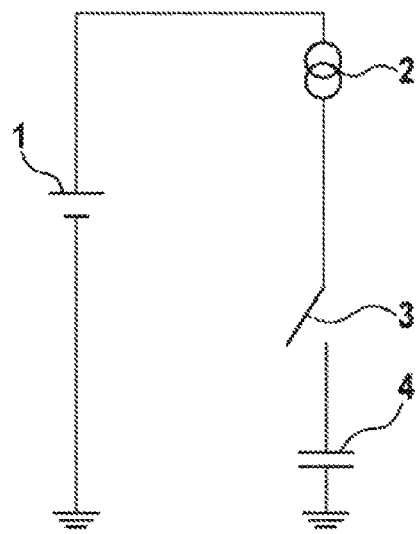
FIG. 5 shows a basic circuit diagram for charging an intermediate-circuit capacitor with a constant-current source according to the prior art.

FIG. 3 shows the simulation results for the circuit arrangement, shown in FIG. 2, for charging an intermediate-circuit capacitor 4 to a voltage of U=250 V. The line with squares on the upper graph is the current; the line with circles on the lower graph is the voltage and the line with the triangles is the power loss in the transistor Q7.

It can be seen that the current increases with increasing voltage across the intermediate-circuit capacitor 4 and decreasing voltage across the current source 2. According to the disclosure, therefore, the voltage across the intermediate-circuit capacitor 4 does not just increase linearly, rather the gradient of the increase likewise increases with increasing intermediate-circuit voltage, with the result that the duration of the precharging operation is reduced.

The dash-dotted line indicates the power loss in the transistor Q7, which power loss remains approximately constant during the entire charging operation, as desired.

The invention claimed is:

1. A method for charging an intermediate-circuit capacitor in a precharging unit, comprising:
   charging the intermediate-circuit capacitor via a current source;
   adjusting a current supplied from the current source to maintain a constant power loss in the current source during the charging of the intermediate-circuit capacitor.

2. The method as claimed in claim 1, the adjusting further comprising:
   acquiring a voltage across the current source during the charging of the intermediate-circuit capacitor; and
   regulating the current supplied from the current source based on the voltage.

3. The method as claimed in claim 1, the adjusting further comprising:
   adjusting the current supplied from the current source using a Zener diode in combination with a resistor.

4. The method as claimed in claim 1, wherein the current source is realized by a current mirror with an appropriate current ratio.

5. A circuit arrangement, comprising:
   a current source configured to provide a charging current;
   a battery connected to the current source and configured to provide power to the current source;
   an intermediate-circuit capacitor connected to the current source via a switch and configured to be charged by the charging current; and
   an adjusting circuit arranged in parallel with the current source, the adjusting circuit being configured to maintain a constant power loss in the current source during a charging the intermediate-circuit capacitor by adjusting the charging current.

6. The circuit arrangement as claimed in claim 5, wherein the adjusting circuit is configured to adjust the charging current based on a voltage difference between a voltage of the battery and a voltage of the intermediate-circuit capacitor.

7. The circuit arrangement as claimed in claim 5, wherein the current of the current source that charges the intermediate-circuit capacitor is adjusted by use of a Zener diode interconnected with a resistor.

8. The circuit arrangement as claimed in claim 5, wherein a voltage difference between a voltage of the battery and a voltage of the intermediate-circuit capacitor is acquired by use of a resistor.

9. A motor vehicle, comprising:
   an electric drive motor configured to drive the motor vehicle; and
   a circuit arrangement connected to said electric drive motor, the circuit arrangement including:
   a current source configured to provide a charging current;
   a battery connected to the current source and configured to provide power to the current source;
   an intermediate-circuit capacitor connected to the current source via a switch and configured to be charged by the charging current; and
   an adjusting circuit arranged in parallel with the current source, the adjusting circuit being configured to maintain a constant power loss in the current source during a charging the intermediate-circuit capacitor by adjusting the charging current.

* * * * *